United States Patent [19]

Eriksoo et al.

[11] 3,718,694
[45] Feb. 27, 1973

[54] N-ARYLACYLAMINO-ALKYL- AND-ALKYLIDENE-DIBENZO[a,d]CYCLOHEPTENES AND-ANTHRACENES AND THE SALTS THEREOF

[75] Inventors: Edgar Eriksoo; Hans Jacob Fex; Knut Bertil Högberg, all of Halsingborg; Henri Rene' Mollberg, Påarp; Oskar Adolf Rohte, Råå, all of Sweden

[73] Assignee: Aktiebolaget Leo, Halsovagen, Halsingborg, Sweden

[22] Filed: Oct. 1, 1969

[21] Appl. No.: 862,918

[30] Foreign Application Priority Data

Oct. 9, 1968 Sweden ..........................13649/1968

[52] U.S. Cl.....260/570.5 C, 260/240 TC, 260/326.5 L, 260/326.85, 260/328, 260/329 F, 260/332.3 P, 260/332.5, 260/340.3, 260/340.9, 260/347.7, 260/501.18, 260/501.19, 260/567.6 OR, 260/570.8 TC, 260/584 C, 424/274, 424/275, 424/278, 424/282, 424/330

[51] Int. Cl..............................................C07c 87/28

[58] Field of Search......260/558 R, 558 P, 570.8 CC, 260/501.18, 570.5 C

[56] References Cited

UNITED STATES PATENTS

| | | | |
|---|---|---|---|
| 3,272,864 | 9/1966 | Hoffsommer, Jr. et al. | 260/570.8 |
| 3,332,977 | 7/1967 | Wendler | 260/570.8 X |
| 3,365,497 | 1/1968 | Wendler et al. | 260/570.8 |
| 3,372,196 | 3/1968 | Engelhardt | 260/570.8 |
| 3,401,192 | 9/1968 | Kollonitch et al. | 260/570.8 X |
| 3,429,921 | 2/1969 | Hjelte et al. | 260/570.8 X |
| 3,454,643 | 7/1969 | Cope et al. | 260/570.8 |

*Primary Examiner*—Robert V. Hines
*Attorney*—Hueschen and Kurlandsky

[57] ABSTRACT

The new compounds of this invention correspond to the general formula

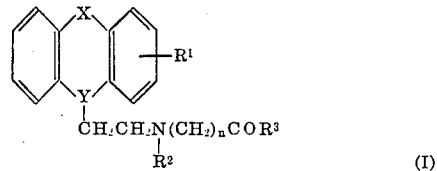

wherein
X represents the radicals $-CH_2-CH_2-$, $-CH=CH-$,

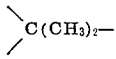

or $-S-$ and
Y represents the radicals

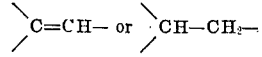

(where the aromatic rings are attached to the same carbon atom),
$n$ is 1, 2 or 3 ($n = 1$ is preferred),
$R^1$ represents H, F, or Cl,
$R^2$ represents an alkylgroup containing not more than four carbon atoms (methyl is preferred),
$R^3$ represents a phenyl, thienyl, furyl, or pyrryl group optionally substituted with not more than three, equal or different, substituents selected from the group consisting of F, Cl, OH, $CF_3$, as well as an alkyl and an alkoxy group containing not more than four carbon atoms; or a phenyl group substituted at 3,4-positions with an alkylidenedioxy (containing not more than six carbon atoms), cycloalkylidenedioxy (containing not more than six carbon atoms), cycloalkylidenedioxy (containing not more than six carbon atoms) or ethylenedioxy group, the compounds act on the C.N.S. as well as pharmaceutically acceptable acid addition salts thereof.

8 Claims, No Drawings

N-ARYLACYLAMINO-ALKYL- AND-ALKYLIDENE-DIBENZO [A,D]CYCLOHEPTENES AND-ANTHRACENES AND THE SALTS THEREOF

The present invention concerns a group of new tricyclic aminoketones having valuable pharmacological properties, as well as processes for the production thereof, compositions thereof, and method of treatment therewith.

The symbols occuring below are defined where first used and have the same definition throughout this description.

The new compounds of this invention correspond to the general formula

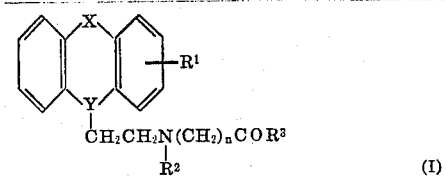

wherein
X represents the radicals —CH$_2$—CH$_2$—, —CH=CH—,

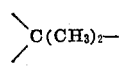

or —S— and
Y represents the radicals

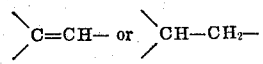

(where the aromatic rings are attached to the same carbon atom), n is 1, 2 or 3 ($n = 1$ is preferred),
R$^1$ represents H, F, or Cl,
R$^2$ represents an alkyl group containing not more than 4 carbon atoms (methyl is preferred),
R$^3$ represents a phenyl, thienyl, furyl, or pyrryl group optionally substituted with not more than three, equal or different, substitutents selected from the group consisting of F, Cl, OH, CF$_3$, as well as an alkyl and an alkoxy group containing not more than four carbon atoms; or a phenyl group substituted at 3,4-positions with an alkylidenedioxy (containing not more than six carbon atoms), cycloalkylidenedioxy (containing not more than six carbon atoms) or ethylenedioxy group,
as well as pharmaceutically acceptable acid addition salts thereof.

The compounds of this invention show an interesting pharmacological profile as characterized by high activity in following tests:

| Test | Reference |
|---|---|
| Antagonism of reserpine-ptosis | R. Domenjoz, W. Theobald, Arch. int. Pharmacodyn. 120, 450 (1959) |
| Antagonism of reserpine hypothermia | B.M. Askew, Life Sciences 2, 725(1963) |
| Potentiation of 3,4-dihydroxyphenylalanine (DOPA) | J.H. Everett, Proceedings of the 1st int. symp. on antidepressive drugs. Exc. Med.Found., Milan 1967. |
| Antagonism of oxotremorine tremor and/or hypothermia | C. Morpurgo, Life Sciences 6, 721(1967) |

This pharmacological activity-profile shows that the compounds have an activity on the central nervous system and thus may be used in diseases of this system. Especially the profile indicates the usefulness of these compounds in treatment of psychic depressive disorders and pathological conditions responsive to treatment with antiparkinson drugs.

Although the above formula comprises compounds of a relatively wide spectrum of pharmacological properties which vary depending on the position and nature of the individual substituents, it is a common character of them that they are active on the central nervous system and exhibit a remarkably low toxicity.

The compounds of this invention as characterized by the general Formula (I) may be prepared by several processes.

One process is the treatment of a carbonyl compound of the general formula

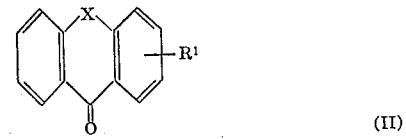

with a compound of the general formula

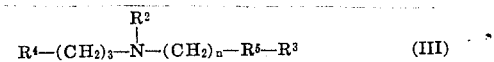

wherein R$^4$ represents MgCl, MgBr or Li and R$^5$ represents a suitably protected carbonyl group, as in form of an acetal of a mono- or difunctional alcohol. The reaction is performed in an inert solvent, such as an ether or a hydrocarbon, in an inert atmosphere consisting of nitrogen or hydrogen at temperature between —20°C and the boiling point of the reaction mixture.

The intermediate of the general Formula (IV) so obtained

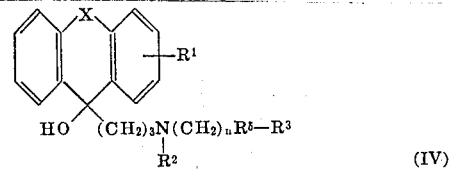

is then dehydrated in conventional manner, such as by treating with hydrochloric acid, sulphuric acid, acetic anhydride or the like, and the protecting group is removed so that the desired compound of the general Formula (I) is obtained.

The intermediary compound of the general Formula (IV) may also be obtained by treating a compound of the general formula

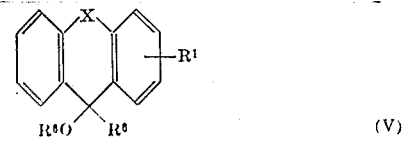

wherein R$^6$ represents an alkali metal, preferably sodium, with a reactive ester of an alcohol of the general formula

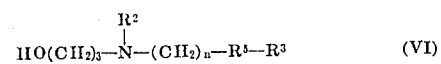

in a solvent medium, such as an ether, hydrocarbon or liquid ammonia at a temperature between −40°C and the boiling point of the reaction mixture. The resulting intermediate of the general Formula (IV) is processed further as indicated above.

The reactive ester may be an ester of a hydrohalogenic acid or an ester of an aromatic or aliphatic sulphonic acid.

Another process for the preparation of compounds of the general Formula (I) is the treatment of a reactive ester of an alcohol of the general formula

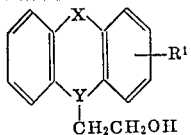 (VII)

with an amine of the general formula

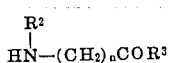 (VIII)

The reaction is preferably carried out in a solvent medium at a temperature from 0°C to the boiling point of the reaction mixture, with or without an acid binding agent, such as an alkali hydroxide, amide, carbonate or hydrogencarbonate. Instead of an acid binding agent an excess of the amine component may be used in the process.

In a further process for the preparation of compounds of the general Formula (I) a secondary amine of the general formula

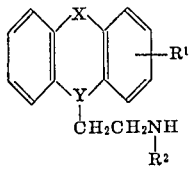 (IX)

is treated with a reactive ester of an alcohol of the general formula $$HO(CH_2)_nCOR^3 \quad (X)$$

The hydrochloric and hydrobromic esters of the alcohol (X) are particularly suitable. The reaction is carried out in the presence of an acid binding agent, such as a hydroxide, carbonate or hydrocarbonate of an alkali or alkaline earth metal, tertiary amines, or in the presence of an excess of the secondary amine of Formula (IX). The reaction can be carried out in one or more of various solvents, such as hydrocarbons, ethers, esters, ketones, or in mixtures of these with water, at a temperature from 0°C to the boiling point of the reaction mixture.

A compound of the general Formula (I) obtained as above may be converted into another compound of the same general formula. Thus compounds in which one or both of the symbols X and Y represents the ethylenic group the latter may be hydrogenated to the corresponding saturated group so that each group of the compounds involved is compatible with the process in question and protected if necessary.

Different stereoisomeric forms of the compound of the general Formula (I) are possible when $R^1$ another group than hydrogen. Mixtures of stereoisomeric forms may be used as such, or if desired separated by conventional methods. As a rule trans-forms of the compounds I, where Y represents an unsaturated radical, show stronger pharmacological activity than the cis-forms. Pure stereoisomers can also be obtained by using pure stereoisomers as starting materials provided that the asymmetric elements (a carbon atom or an ethylenic bond) is not affected by the process.

For therapeutic purposes the bases of the general Formula (I) may be employed as such or in the form of acid addition salts containing anions which are pharmaceutically acceptable, such as hydrochlorides, hydrobromides, phosphates, nitrates, sulphates, hydrogenoxalates, oxalates, succinates, tartrates, methanesulphonates and ethandisulphonates, so that the beneficial physiological properties are not vitiated by side-effect ascribable to the anions. For some purposes they may be used in the form of quaternary ammonium salts obtained by reaction with organic halides or other reactive organic esters (e.g., a lower alkyl or benzyl chloride, bromide, iodide; alkyl or aryl sulphonate).

The compounds described may be administered in a conventional way, for example orally in the form of tablets or capsules or parenterally in the form of solutions or suspensions in pharmacologically acceptable vehicles.

The following examples are intended to illustrate but not to limit the scope of the present invention.

EXAMPLE 1

Nineteen parts of 2-methylaminomethyl-2-phenyl-1,3-dioxolane are dissolved in 200 parts of dry toluene and 5 parts of sodium amide are added followed by 31.5 parts of 1-bromo-3-chloropropane. The reaction mixture is refluxed in an atmosphere of nitrogen for 16 hours. After cooling to room temperature the excess of sodium amide is destroyed by addition of ethanol and the reaction mixture is then poured into ice-water. The organic phase is separated, dried over anhydrous sodium sulphate and evaporated to dryness in vacuo. The crude 2-[N-(3-chloropropyl)-N-methyl]-aminomethyl-2-phenyl-1,3-dioxolane is purified by crystallization of its hydrogen oxalate from butanone (M.p. 138°C).

27 parts of 2-[N-(3-chloropropyl)-N-methyl]-aminomethyl-2-phenyl-1,3-dioxolane are dissolved in 200 parts of dry Tetrahydrofuran and 2.3 parts of magnesium turnings are added in small portions. The mixture is stirred and refluxed until the formation of the magnesium complex is complete. A solution of 18.7 parts of 10,11-dihydro-5H-dibenzo(a,d)cyclohepten-5-one in 100 parts of dry tetrahydrofuran is then added dropwise.

After refluxing the mixture for 6 hours stirring is continued over night at room temperature. The magnesium complex is then hydrolyzed by addition of saturated aqueous ammonium chloride solution. The mixture is then extracted with ether and the extract is washed with water and then saturated with hydrogen chloride. Hydrochloric acid is added and the mixture is treated on a steam bath for 1 hour. The reaction mixture so obtained is then poured into ice and neutralized to pH = 3.5 and then extracted with ether. The etheral phase is washed with water and dried, whereafter a solution of oxalic acid in butanone is added.

The hydrogen oxalate of 5-(N-phenacyl-N-methyl-3-aminopropyliden)-10,11-dihydro-5H-dibenzo(a,d)cycloheptene precipitates and is filtered off. M.p. 167.5°C.

EXAMPLE 2

To 150 parts of liquid ammonia are added 20.8 parts of 10,11-dihydro-5H-dibenzo(a,d)cylohepten-5-one dissolved in 50 parts of toluene. While stirring and refluxing the reaction mixture 4.6 parts of sodium are added in small portions (30 minutes).

A solution of 27 parts of 2-[N-(3-chloropropyl)-N-methyl]--aminomethyl-2-phenyl-1,3-dioxolane in 50 parts of toluene are added dropwise during 30 minutes. The reaction mixture is left to evaporate the ammonia. Water is then added to the residue and the organic phase is separated, washed with water and evaporated to dryness in vacuo.

The residue obtained contains the same intermediate as in Example 1 and is processed further in the same way so that ultimately the 5-[N-phenacyl-N-methyl-3-aminopropylidene]-10,11-dihydro-5H-dibenzo(a,d)cycloheptene is obtained as hydrogen oxalate. M.p. 167°C.

EXAMPLE 3

2.5 parts of 2-methylaminomethyl-2-(4-methoxyphenyl)-1,3-dioxolane are dissolved in 25 parts of acetonitrile and 5 parts of 5-(3- bromopropyl)-10,11-dihydro-5H-dibenzo(a,d)cycloheptene are added. The reaction mixture is refluxed for 8 hours. After cooling to room temperature 1.35 parts of hydrogen chloride in 10 parts of water are added. The solution is left at room temperature for 16 hours and then poured into a solution of 10 parts of potassium carbonate in water. The resulting mixture is extracted with ether. The ethereal extract is evaporated to dryness in vacuo. The residue is dissolved in butanone and a solution of oxalic acid in butanone is added.

After cooling crystals of the hydrogen oxalate of the 5-[N-(4-methoxy-phenacyl)-N-methyl-3-aminopropyl]-5H-dibenzo(a,d)cycloheptene precipitate and are filtered off. M.p. 187.5°–8.5°C.

EXAMPLE 4

26.7 parts of 9-(3-methyl-aminopropyliden-thioxanthen and 25.2 parts of ω-bromo-4-methoxy acetophenone are dissolved in 300 parts of benzene and a solution of 13.6 parts of sodium hydrogen-carbonate in 150 parts of water are added. The reaction mixture is then stirred for 3 hours at room temperature. The aqueous phase is separated and discarded. The organic phase is extracted with an aqueous solution of hydrochloric acid until pH= 3.2 is obtained. The organic phase is then dried over anhydrous sodium sulphate and poured into a solution of equimolar amount of oxalic acid in butanone.

The crystals of the hydrogen oxalate of 9-[N-(4-methoxy-phenacyl-N-methyl-3-aminopropylidene]-thioxanthene so obtained have the melting point of 194°–5C.

In the same manner as in the example above the following compounds are prepared:

5-(N-phenacyl-N-methyl-3-aminopropylidene)-10,11-dihydro-5H-dibenzo(a,d)cycloheptene hydrogen oxalate, m.p. 167.5°C.

5-[N-(4-methoxyphenacyl)-N-methyl-3-aminopropylidene]-10,11-dihydro-5H-dibenzo(a,d)cycloheptene hydrogen oxalate, m.p. 171°C.

5-[N-(4-chlorophenacyl)-N-methyl-3-aminopropylidene]-10,11-dihydro--5H-dibenzo(a,d)cycloheptene hydrogen oxalate, m.p. 150°–3°C.

5-[N-(4-n-butoxyphenacyl)-N-methyl-3-aminopropylidene]-10,11-dihydro-5H-dibenzo(a,d)cycloheptene hydrogen oxalate, m.p. 163.5°–164.5°C.

5-[N-(4-i-propoxyphenacyl)-N-methyl-3-aminopropylidene]-10,11-dihydro-5H-dibenzo(a,d)cycloheptene hydrogen oxalate, m.p. 158°–158.5°C.

5-[N-(4-ethoxyphenacyl)-N-methyl-3-aminopropylidene]-10,11-dihydro-5H-dibenzo(a,d)cycloheptene hydrogen oxalate, m.p. 167.5°C.

5-[N-(3,4-ethylendioxyphenacyl)-N-methyl-3-aminopropylidene]-10,11-dihydro-5H-dibenzo(a,d)cycloheptene hydrogen oxalate, m.p. 188.5°C (decomp.)

5-[N-(4-chloro-2-thenoylmethyl)-N-methyl-3-aminopropylidene]-10,11-dihydro-5H-dibenzo(a,d)cycloheptene hydrogen oxalate, m.p. 165.5°–166.5°C.

5-[N-(3,4-cyclohexylidenedioxyphenacyl)-N-methyl-3-aminopropylidene]-10,11-dihydro-5H-dibenzo(a,d)cycloheptene hydrogen oxalate, m.p. 177–8°A C.

5-[N-(2-thenoylmethyl)-N-methyl-3-aminopropylidene]-10,11-dihydro-5H-dibenzo(a,d)cycloheptene hydrogen oxalate, m.p. 178°–9C.

5-[N-(4-chlorophenacyl)-N-methyl-3-aminopropyl]-5H-dibenzo(a,d)-cylcoheptene hydrogen oxalate, m.p. 184.5°C (decomp.)

5-[N-(4-methoxyphenacyl)-N-methyl-3-aminopropyl]-5H-dibenzo(a,d)-cycloheptene hydrogen oxalate, m.p. 187.5°–8.5°C.

9-[N-(4-chlorophenacyl)-N-methyl-3-aminopropylidene]-9,10-dihydro-10,10-dimethylanthracene hydrochloride, m.p. 170°–1°C.

9-[N-(4-methoxyphenacyl)-N-methyl-3-aminopropylidene]-9,10-dihydro-10,10-dimethylanthracene hydrogen oxalate, m.p. 175°–7°C.

9-[N-(4-chlorophenacyl)-N-methyl-3-aminopropylidene]-thioxanthene hydrochloride, m.p. 171°–2°C.

9-[N-(4-methoxyphenacyl)-N-methyl-3-aminopropylidene]-thioxanthene hydrogen oxalate, m.p. 194°–5°C.

5-[N-(4-chlorophenacyl)-N-methyl-3-aminopropylidene]-5H-dibenzo(a,d)cycloheptene hydrogen oxalate, m.p. 176°–8°C (decomp.)

5-[ N-(4-methoxyphenacyl)-N-methyl-3-aminopropylidene]-5H-dibenzo(a,d)cycloheptene hydrogen oxalate, m.p. 193°–4°C (decomp.)

5-[N-(4-chlorophenacyl)-N-methyl-3-aminopropyl]-10,11-dihydro-5H-dibenzo(a,d)cycloheptene hydrogen oxalate, m.p. 180.5°–1.5°C.

5-[N-(4-methoxyphenacyl)-N-methyl-3-aminopropyl]-10,11-dihydro-5H-dibenzo(a,d)cycloheptene hydrogen oxalate, m.p. 165°–6C.

EXAMPLE 5

5.0 parts of 5-(N-methyl-3-aminopropylidene-10,11-dihydro-5H-dibenzo(a,d)cycloheptene are dissolved in 48 parts of toluene. 4.18 parts of 4-chlorobutyrophenone and 0.1part of potassium iodide are added. The reaction mixture is refluxed for 18 hours and after cooling extracted with water. The extract is discarded. The toluene solution is then evaporated to dryness. The residue is dissolved in 50 parts of acetone and 17 parts of acetic anhydride are added. The reaction mixture is left for 24 hours at room temperature and then poured into ice-water. Potassium carbonate is added to pH = 9 and the mixture is extracted with ether. The ether extract is evaporated to dryness. The residue is dissolved in methanol and a solution of oxalic acid in butanone is added. After cooling crystals of 5-[N-(3-benzoyl-propyl)-N-methyl-3-aminopropylidene]-10,11dihydro-5H-dibenzo(a,d)cycloheptene hydrogen oxalate separated and are filtered off. M.p. 161°–3C.

In the same manner as in the example above the following compounds are prepared: ,dihydro-
trans-2-chloro-9-N-phenacyl-N-methyl-3-aminopropylidene-thioxanthene,
trans-2-chloro-9-{N-phenacyl-N-methyl-3-aminopropylidene}-thioxanthene,
trans-2-fluro-9-4N-[2-(4-fluorobenzoyl)ðyl]-N-methyl-3-aminopropylidene}-thioxanthene,
5-(N-phenacyl-N-n-propyl-3-aminopropylidene)-10,11-dihydro-5H-dibenzo(a,d)cycloheptene.

EXAMPLE 6

10,000 tablets of 50 mg each.

| | |
|---|---|
| 5-[N-(4-methoxyphenacyl)-N-methyl-3-aminopropyl]-5H-dibenzo(a,d)cycloheptene hydrochloride | 500 g |
| Lactose | 1,600 g |
| Starch | 560 g |
| Polyvinylpyrrolidone | 25 g |
| Magnesiumstearate | 15 g |
| Talc | 150 g |
| Water | q.s. |

The 5-[N-(4-methoxyphenacyl)-N-methyl-3-aminopropyl]-5H-dibenzo(a,d)cycloheptene hydrochloride, lactose and starch are mixed together and screened. The polyvinylpyrrolidone is dissolved in a suitable amount of water and added to said mixture, which is then granulated. The granulate obtained is then dried and mixed with the magnesiumstearate and the talc, whereafter tablets are made.

EXAMPLE 7

Aqueous suspension for injection.

| | |
|---|---|
| 5-(N-phenacyl-N-methyl-3-aminopropylidene)-10,11-dihydro-5H-dibenzo(a,d)cycloheptene hydrochloride | 250 |
| 1mg Methylcellulose | 15 mg |
| Polyoxyethylenesorbitan monostearate | 20 mg |
| Distilled water to make | 5ml |

Where the foregoing examples produce a compound having a methyl or other lower-alkyl group, it is to be understood that compounds containing other lower-alkyl groups of straight or branched nature and containing up to four carbon atoms inclusive, such as methyl, ethyl, propyl, isopropyl, butyl, sec.-butyl, or t.-butyl are prepared in the same manner by substitution in the process of the appropriate different lower-alkyl starting material. Similarly, where methoxy or an other lower-alkoxy group is present, compounds having other lower-alkoxy groups containing various lower-alkyl groups having up to four carbon atoms inclusive are prepared in the same manner from the appropriate different lower-alkoxy starting material. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways or modes, for example, orally as in capsules or tablets, or parenterally in the form of sterile solutions, suspensions, or by pellet implantation and in some cases intravenously in the form of sterile solutions. Other modes of administration are cutaneously, subcutaneously, bucally, intramuscularly, and intraperitoneally.

As representative of living animal bodies which may be treated with the compounds and compositions of the invention, and according to the method of treating of the invention, for alleviation of the same and/or similar conditions as those described, in addition to human beings may be mentioned the following: domestic animals such as dogs and cats, farm animals such as horses, cows, sheep and goats.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 5.0 milligrams, may be used in cases of administration to subjects having a relatively low body weight, unit dosages are preferably 5 milligrams or above and preferably 25, 50, or 100 milligrams, or even higher, depending of course upon the subject treated and the particular result desired, as will be apparent to one skilled in the art. Broader ranges appear to be 1 to 3,000 milligrams per unit dose. The active agents of the invention may be combined for administration with other pharmacologically active agents, such as analgesics, tranquilizers, steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical and/or veterinary principles. As a rule, however, when used therapeutically in human, the present compounds may be administered in a quantity of 25 to 1,500 milligrams per day and patient, divided in 1 to 4 doses, during a period of 1 day to 1 year.

Various modifications and equivalents will be apparent to one skilled in the art and may be made in the compounds, compositions and methods of the present invention without departing from the spirit or scope thereof, and it is therefore to be understood that the invention is to be limited only by the scope of the appended claims.

What is claimed is:

1. Tricyclic amino ketones having the general formula

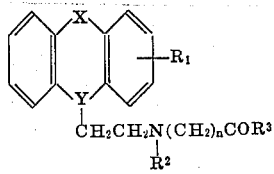

wherein
X represents $-CH_2-CH_2-$, $-CH=CH-$, $=C(CH_3)_2$,
Y represents $=C=CH-$ or $=CH-CH_2-$,
$n$ is 1, 2 or 3,
$R^1$ represents H, F, or Cl,
$R^2$ represents an alkyl group having not more than four carbon atoms,
$R^3$ represents phenyl or phenyl substituted with F, Cl, OH, $CF_3$, alkyl of not more than four carbon atoms, or alkoxy of not more than four carbon atoms, and pharmaceutically acceptable acid addition salts thereof.

2. Tricyclic amino ketones according to claim 1, wherein $n$ is 1 and $R^2$ represents $CH_3$.

3. The tricyclic amino ketone in accordance with claim 1 which is 5-(N-phenacyl-N-methyl-3-aminopropyliden)- 10,11-dihydro-5H-dibenzo(a,d)cycloheptene.

4. A compound in accord with claim 1, which is 5-[N-(4-methoxyphenacyl)-N-methyl-3-aminopropylidene]-10,11-dihydro-5H-dibenzo(a,d)cycloheptene.

5. A compound in accord with claim 1, which is 5-[N-(4-chlorophenacyl)-N-methyl-3-aminopropyl]-5H-dibenzo(a,d)-cycloheptene.

6. A compound in accord with claim 1, which is 9-[N-(4-chlorophenacyl)-N-methyl-3-aminopropylidene]-9,10-dihydro-10,10-dimethylanthracene.

7. A compound in accord with claim 1, which is 5-[N-(4-chlorophenacyl)-N-methyl-3-aminopropylidene]-5H-dibenzo(a,d)cycloheptene.

8. A compound in accord with claim 1, which is 5-[N-(4-methoxyphenacyl)-N-methyl-3-aminopropyl]-10,11-dihydro-5H-dibenzo(a,d)cycloheptene.

* * * * *

UNITED STATES PATENT OFFICE
CERTIFICATE OF CORRECTION    page 1

Patent No. 3,718,694  Dated February 27, 1973

Inventor(s) EDGAR ERIKSOO, ET AL.

It is certified that error appears in the above-identified patent and that said Letters Patent are hereby corrected as shown below:

Line 2 of Title:
"ALKYLIDENE-DIBENZO [a,d] CY" should be ---ALKYLIDENE-DIBENZO [a,d] CY- ---.

IN THE LAST SENTENCE OF THE ABSTRACT:
"cycloalkylidenedioxy (containing not more than six carbon atoms), cycloalkylidenedioxy (containing not more than six carbon atoms)" should be ---cycloalkylidenedioxy (containing not more than six carbon atoms),---.

Column 1, in the Title:
"[A,D]" should be ---[a,d]---.

Column 1, line 10:
"occuring" should be ---occurring---.

Column 1, line 44:
"substitutents" should be ---substituents---.

Column 3, line 67:
"$R^1$ another group" should be ---$R^1$ represents another group---.

Column 4, line 49:
"Tetrahydrofuran" should be ---tetrahydrofuran---.

Column 5, line 9:
"cylohepten" should be ---cyclohepten---.

UNITED STATES PATENT OFFICE
CERTIFICATE OF CORRECTION

Patent No. 3,718,694  Dated February 27, 1973

Inventor(s) EDGAR ERIKSOO, ET AL.

It is certified that error appears in the above-identified patent and that said Letters Patent are hereby corrected as shown below:

Column 5, line 64:
"phenacyl -N" should be ---phenacyl) - N---.

Column 6, line 34:
"m.p. 177-8° AC" should be m.p. 177-8° C---.

Column 6, line 37:
"178°-9 C" should be ---178-9° C---.

Column 6, line 68:
"165°-6 C" should be ---165-6° C---.

Column 7, line 19:
"10, 11 dihydro" should be ---10, 11, dihydro---.

Column 7, line 21:
"161°-3 C" should be 161-3° C---.

Column 7, line 23:
"prepared:,dihydro" should be ---prepared:---.

UNITED STATES PATENT OFFICE
CERTIFICATE OF CORRECTION

Patent No. 3,718,694     Dated February 27, 1973

Inventor(s) Edgar Eriksoo et al.     Page - 3

It is certified that error appears in the above-identified patent and that said Letters Patent are hereby corrected as shown below:

Column 7, lines 24-29, should read as follows:
-- trans-2-chloro-9-(N-phenacyl-N-methyl-3-aminopropylidene)-thioxanthene, trans-2-fluoro-9-{N-[2-(4-fluorobenzoyl)-ethyl]-N-methyl-3-aminopropylidene}-thioxanthene, --; between lines 29 and 30, insert -- 5-{N-[3-(4-fluorobenzoyl)-propyl]-N-methyl-3-aminopropyl}-5H-dibenzo(a,d)cycloheptene, --; line 58, "250" should read -- 250 mg --; line 59, "1 mg Methylcellulose" should read -- Methylcellulose --; line 60, "Polyoxyethylene-sorbitan monostearate" should read -- Polyoxyethylenesorbitan monostearate
    (Tween 80 (TM) Atlas) --.

Signed and sealed this 27th day of August 1974.

(SEAL)
Attest:

McCOY M. GIBSON, JR.                C. MARSHALL DANN
Attesting Officer                   Commissioner of Patents